Patented June 15, 1948

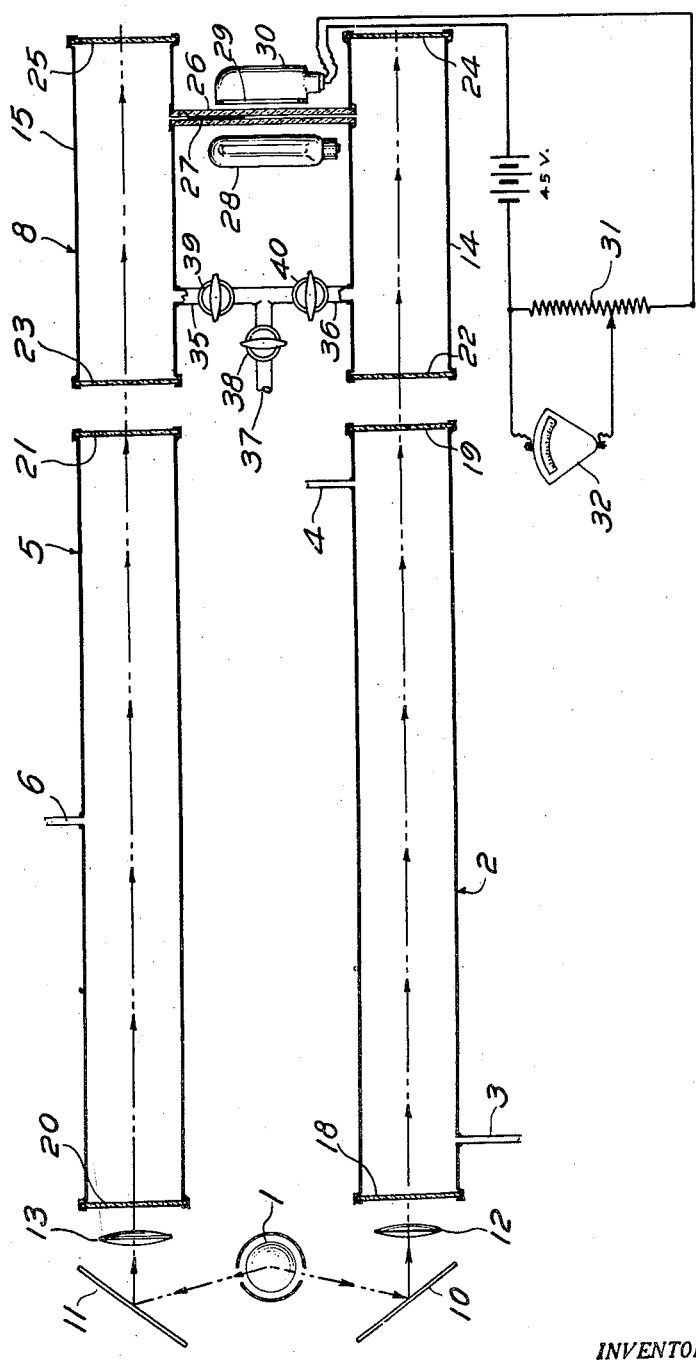
INVENTORS
RAY E. KIDDER.
JOHN W. BERRY,
BY
Wm. P. Spielman
ATTORNEY

2,443,427

UNITED STATES PATENT OFFICE 2,443,427

INFRARED GAS ANALYZER

Ray E. Kidder, Riverside, and John W. Berry, Greenwich, Conn., assignors to American Cyanamid Company, New York, N. Y., a corporation of Maine Application August 29, 1944, Serial No. 551,756

3 Claims. (Cl. 250—43)

This invention relates to apparatus for the determination of infrared-absorbing material in gases, and more particularly for the quantitative determination of such materials when present in admixture with other gases. The invention includes apparatus for the quantitative determination of gaseous infrared-absorbing material in admixture with other gases as well as methods of analysis based on the selective absorption of infrared radiation by such materials.

It is a well-known fact that many gases and vapors will absorb infrared radiation, by which term we designate electromagnetic waves having a frequency lower than the lowest frequency waves of the visible spectrum and having a wave length of about 1–30 microns. Several analytical methods have been based on measurements of the energy change in a gas as a result of such absorption, and at least one U. S. Patent, No. 2,212,211 to Pfund, has been granted on apparatus embodying this principle. The apparatus of Pfund operates by passing a beam of substantially monochromatic infrared radiation through an absorption cell after which the radiation is focused on a bolometer or on a gas thermometer which determines the total quantity of heat contained in the radiation. By first calibrating the apparatus with a non-absorbing gas such as carbon dioxide-free air and then admitting an absorbing gas such as carbon dioxide to the absorption chamber Pfund was able to determine quantitatively the difference in the heat content of the infrared radiations before and after their partial or complete absorption by the sample under test. This method is subject, however, to several objections which are overcome by the present invention.

It is a principal object of the present invention to provide a gas analysis apparatus having improved accuracy, particularly with respect to changes in the room temperature surrounding the apparatus. A further object is the provision of an apparatus of the class described having a greatly reduced sensitivity to changes in the intensity of the radiation from the infrared source during the analysis. A still further object is the provision of an apparatus which requires no sharp filtering of the infrared radiation. Further objects will be pointed out in the following description of preferred embodiments of the invention.

As has been pointed out, the instruments of the prior art have operated on the principle of determining the total quantity of absorbed infrared radiation before and after partial absorption of the radiation by a test sample at a constant wave length. The present invention is based on the principle of passing two beams of infrared radiation simultaneously into separate gas chambers filled with a material which absorbs infrared radiation at the particular wave length at which infrared radiation is absorbed by the material under test, so that no filtering or monochromating of the radiation is necessary. When a sample of the unknown gas under test is introduced into the path of one of the beams of infrared radiation it absorbs a quantity of radiation proportional to the amount of absorbing material present, and the absorption in the gas chamber is reduced correspondingly. The difference in absorption between the two gas chambers is then determined, and in the preferred embodiment of our invention this difference is measured electrically and preferably is recorded continuously. It will thus be seen that our invention is based on the determination of the difference in absorption of infrared radiation between two bodies of the same absorbing gas, a sample of the gas under test being interposed between one of said bodies and the source of infrared radiation. In a preferred form of our invention a standard gas absorption cell is interposed between the radiation source and the other of said bodies in order to provide a standard for the measurement and also to obtain greater flexibility in the calibration and use of the apparatus. In all cases, however, the difficult problem of regulating and determining the total quantity of infrared radiation is avoided by the apparatus of our invention, since measurements are made of differences in absorption.

In addition to the greater sensitivity obtained by measuring only the degree of unbalance in an originally balanced system, our invention presents the additional important advantage of providing a ready means of recording permanently and automatically the results of the analysis. Differences in the absorption of infrared radiation in the gas chambers are most readily measured in terms of temperature difference, since an increase in temperature of one chamber over the other is a function of the difference in the quantity of radiation absorbed. Such temperature differences can be readily determined by means of instruments of great sensitivity, such as by thermocouples or by a differential manometer or by other known means for determining and recording temperature differences.

The invention will be illustrated in greater detail by reference to the accompanying drawing, the single figure of which is a diagrammatic illustration of one embodiment of our invention. Referring to this drawing, the apparatus includes generally a source of infrared radiation 1, which may be an electrically heated silicon carbide rod, an absorption cell 2 provided with inlet 3 and outlet 4 for the gas under test, a standard gas absorption cell 5 having an inlet 6 for the introduction of a reference gas, and a detector which is indicated generally by reference numeral 8. Radiation from the source 1 is preferably reflected by mirrors 10 and 11 through lenses 12 and 13 into and through the cells 2 and 5 respectively and then into the respective chambers 14 and 15 of the detector which will subsequently be described.

The unknown gas absorption cell 2 is preferably cylindrical in shape and is provided with gas-tight windows 18 and 19 at its opposite ends. These windows may be composed of fluorite or of rock salt or other material that is transparent to infrared radiations. The cell may be of any suitable size and length, the proper length depending largely upon the concentration of the infrared radiation-absorbing constituent in the gas under test and its absorbing capacity. The standard gas absorption cell 5 is similar and preferably identical in size and shape with the unknown gas absorption cell 2, and is provided with similar fluorite or rock salt windows 20 and 21. This cell may contain a gas such as pure nitrogen which has no absorption capacity for infrared radiation at any wave length, it may contain a known concentration of an infrared-absorbing ingredient such as, for example, the ingredient that is being quantitatively determined in the unknown gas. In other words, the standard cell 5 may operate at zero absorption or it may operate at a known absorption of the infrared radiation.

The detector cell 8 is made up of two gas chambers 14 and 15, which are preferably identical in size and shape. The gas chamber 14 is provided with a window 22 opposite the window 19 of the unknown gas absorption cell 2, while the cell 15 has a similar window 23 opposite the window 21 in the standard gas absorption cell. Similar windows 24 and 25 may be placed in the opposite ends of the chambers 14 and 15 if desired, since it is quite feasible to employ a series of detector cells mounted behind each other when analyzing a multi-component gas. However, apparatus containing a plurality of detector cells is not claimed as such in the present application, since this constitutes a part of the subject matter of an application of R. B. Barnes, Serial No. 551,735, filed concurrently herewith, now Patent No. 2,431,019, granted November 18, 1947.

The two gas chambers 14 and 15 of the detector 8 are connected to an indicator which is responsive to differences in infrared absorption therein. This indicator may take the form of a pair of thermocouples, preferably of high impedance, one mounted in each of the two cells but shielded from direct impact of the infrared radiations by means of suitable shields or baffles. By so connecting the thermocouples that the electric output of one is opposed to the electric output of the other any difference in infrared absorption in the two chambers can be measured directly as an electric current. This current may be amplified, as by feeding it to the grid circuit of an electron emitting tube or by any other suitable means.

In accordance with the preferred embodiments of the present invention the difference in infrared absorption in the two chambers is measured as a function of the difference in gas pressure therein. This is accomplished by connecting the chambers 14 and 15 by a differential manometer tube 26 containing a droplet 27 of mineral oil. Any change in temperature between the two chambers will result in a momentary difference between the internal gas pressures, which will in turn cause a lateral motion of the oil droplet 27 in the manometer until the pressures have been equalized. This movement is translated into electric current by employing the oil droplet 27 as a moveable lens to focus light on a photoelectric cell, the output of which can be electrically measured and recorded.

In accordance with this feature of our invention we provide a photoelectric cell 30 having a slit 29 adjacent the manometer tube 26 and position it so that one end of the oil dropet 27 is opposite the other end of the slit 29. This adjustment is the preferred zero position of the apparatus. Light from a single filament lamp bulb 28 falls on the droplet 27, which focuses it onto the slit 29. As the oil droplet moves in response to a reduction in pressure in the chamber 14 it passes across a greater part of the slit 29 and focuses a correspondingly greater quantity of light on the photoelectric element 30. This element is connected in series with a 45 volt battery and with a resistance 31, the circuit being connected through a variable part of the resistance with a galvanometer 32. Changes in the output of the photoelectric element are measured by the galvanometer, and a record of these measurements can readily be made by the use of a recording galvanometer.

The advantages of the apparatus of our invention are apparent from a description of the operation thereof. It is a well-known fact that many chemical compounds exhibit spectra in the infrared which are characterized by intense absorption at certain definite wave lengths when infrared radiation is passed through the compound. Typical compounds of this class are carbon dioxide, sulfur dioxide, hydrogen sulfide, carbon monoxide, HCN, unsaturated aliphatic hydrocarbons and the like. Quantitative determinations of such compounds in the gaseous state by means of infrared radiations have heretofore been made by determining either the total quantity of radiation before and after passage of a beam of the radiation through the test sample or by first determining the temperature of an absorbing gas such as carbon dioxide upon exposure to an uninterrupted beam of radiation and then making a second determination of the temperature after the introduction of a test sample into the path of the radiation, as is described in the Pfund patent. In both methods the quantity of radiation must remain constant throughout the test, which is very difficult in practice. In the second method the gas thermometer chamber must be completely insulated from ambient temperature changes during the entire test, as otherwise an erroneous reading will be obtained. In operating the apparatus of the present invention, however, both chambers 14 and 15 in the detector cell are filled with an absorbing gas such as a known quantity of the component sought in the gas under test by means of tubes 35 and 36 which are joined by a T connection 37, all the stopcocks 38, 39 and 40 being open. When the stopcock 38 is closed the gas pressure in the chambers 14 and 15 is of course the same. Stopcocks 39 and 40 are then closed. The apparatus is adjusted by passing equal quantities of infrared radiation from source 1 through the cells 2 and 5 while the cells contain no infrared-absorbing material. An equal temperature rise will take place in the two chambers 14 and 15 and no temperature difference will be recorded. The position of the oil droplet under these conditions is taken as a zero reading of the instrument, and this position may be adjusted by opening the stopcocks 39 and 40 and tilting the apparatus. A sample of the gas to be analyzed is then introduced into the unknown gas absorption cell 2 whereupon the quantity of radiation absorbed in the chamber 14 will be decreased by the amount of absorption in the chamber 2. This decrease in infrared absorption in the chamber 14, as compared with the amount of absorption taking place at the same time in the chamber 15, will result in a movement of the oil droplet 27 towards the chamber 14, and this movement will focus a greater quantity of light from the bulb 28 onto the photoelectric element 30. The resulting change in electrical output of the photoelectric element is measured by reading the galvanometer 32.

From the foregoing description of a preferred embodiment of the invention it will be seen that all the objects thereof have been accomplished. By the provision of a detector containing a pair of absorption gas chambers which are balanced at a zero reading of the apparatus together with means to measure the degree of unbalance caused by the introduction of a test sample into the path of one of the beams of infrared radiation, it will be seen that the absorption of radiation by the test sample is measured directly. Temperature changes that may occur during the measurement, or during continuous use of the apparatus for a series of measurements, will not affect the accuracy of the reading obtained, since both the chambers 14 and 15 are affected equally by such temperature changes. By introducing the standard gas absorption cell 5 into the path of the other beam of infrared radiation it is possible to calibrate the apparatus against a known standard, and thus the instrument is readily adaptable to a wide variety of uses.

What we claim is:

1. Apparatus for the quantitative determination of gaseous infrared-absorbing material comprising in combination an unknown gas absorption cell, a standard gas absorption cell and a detector including two gas chambers connected to an indicator responsive to differences in infrared absorption therein, means for admitting a sample of the gas under test to the unknown gas absorption cell, means for admitting to both chambers of the detector a gas which absorbs infrared radiation at a wave length at which the radiation is absorbed by the material under test, means for passing infrared radiation through said unknown gas absorption cell and then into one of the gas chambers of said detector cell, and means for simultaneously passing an equal quantity of infrared radiation through said standard gas absorption cell and then through the other gas chamber of said detector cell.

2. Apparatus for the quantitative determination of gaseous infrared-absorbing material comprising in combination an unknown gas absorption cell, a standard gas absorption cell and a detector including two gas chambers connected by a manometer, means for admitting a sample of the gas under test to the unknown gas absorption cell, means for admitting to both chambers of the detector a gas which absorbs infrared radiation at a wave length at which the radiation is absorbed by the material under test, means for passing infrared radiation through said unknown gas absorption cell and then into one of the gas chambers of said detector cell, and means for simultaneously passing an equal quantity of infrared radiation through said standard gas absorption cell and then through the other gas chamber of said detector cell.

3. Apparatus for the quantitative determination of gaseous infrared-absorbing material comprising in combination an unknown gas absorption cell, a standard gas absorption cell, and a detector including two gas chambers connected by a light-transmitting capillary tube, means for admitting a sample of the gas under test to the unknown gas absorption cell, means for admitting to both chambers of the detector a gas which absorbs infrared radiation at a wave length at which the radiation is absorbed by the material under test, means for passing a quantity of infrared radiation through said unknown gas absorption cell and then into one of the gas chambers of said detector cell, and means for simultaneously passing an equal quantity of infrared radiation through said standard gas absorption cell and then through the other gas chamber of said detector cell, a light source and a photoelectric element adjacent the capillary tube of said detector cell, a moveable transparent droplet in said capillary tube adapted to focus light from said source on said photoelectric element and means for measuring the output of said photoelectric element.

RAY E. KIDDER.
JOHN W. BERRY.

REFERENCES CITED

The following references are of record in the file of this patent:

UNITED STATES PATENTS

| Number | Name | Date |
|---|---|---|
| 1,695,031 | Schmick | Dec. 11, 1928 |
| 1,758,088 | Schmick | May 13, 1930 |
| 2,212,211 | Pfund | Aug. 20, 1940 |
| 2,269,674 | Liddel | Jan. 13, 1942 |